(12) United States Patent
Virmani

(10) Patent No.: US 10,402,254 B2
(45) Date of Patent: Sep. 3, 2019

(54) STORAGE DRIVE MONITORING

(71) Applicant: SEAGATE TECHNOLOGY LLC, Cupertino, CA (US)

(72) Inventor: Ashish Virmani, Haryana (IN)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 15 days.

(21) Appl. No.: 14/938,462

(22) Filed: Nov. 11, 2015

(65) Prior Publication Data

US 2017/0132059 A1 May 11, 2017

(51) Int. Cl.
*G06F 11/07* (2006.01)

(52) U.S. Cl.
CPC ............ *G06F 11/079* (2013.01); *G06F 11/07* (2013.01); *G06F 11/0727* (2013.01); *G06F 11/0751* (2013.01); *G06F 11/0772* (2013.01)

(58) Field of Classification Search
CPC ............ G06F 11/2733; G06F 11/0727; G06F 11/3034; G06F 11/0772; G06F 11/0751; G06F 3/0653; G01R 31/31912
See application file for complete search history.

(56) References Cited

U.S. PATENT DOCUMENTS

| 5,917,724 | A | 6/1999 | Brousseau et al. | |
|---|---|---|---|---|
| 7,743,284 | B1 * | 6/2010 | Taylor | G06F 11/0727 |
| | | | | 714/42 |
| 7,984,259 | B1 * | 7/2011 | English | G06F 3/061 |
| | | | | 711/114 |
| 8,370,615 | B2 | 2/2013 | Chiu | |
| 8,843,781 | B1 * | 9/2014 | Chiang | G06F 3/06 |
| | | | | 714/42 |
| 9,311,176 | B1 * | 4/2016 | Khokhar | G06F 11/008 |
| 2004/0103337 | A1 * | 5/2004 | Smith | G06F 11/008 |
| | | | | 714/2 |
| 2005/0278575 | A1 * | 12/2005 | Nicholson | G06F 11/008 |
| | | | | 714/37 |
| 2007/0083703 | A1 * | 4/2007 | Kolli | G06F 3/0613 |
| | | | | 711/112 |
| 2007/0174720 | A1 * | 7/2007 | Kubo | G06F 11/008 |
| | | | | 714/42 |
| 2008/0243956 | A1 * | 10/2008 | Yamamoto | G06F 11/1469 |
| 2010/0299548 | A1 * | 11/2010 | Chadirchi | G06F 1/263 |
| | | | | 713/340 |

FOREIGN PATENT DOCUMENTS

WO 9837557 A1 8/1998

\* cited by examiner

*Primary Examiner* — Yolanda L Wilson
(74) *Attorney, Agent, or Firm* — Holland & Hart LLP

(57) ABSTRACT

Systems and methods for real-time storage drive monitoring are described. In one embodiment, the method may include monitoring one or more aspects of a storage drive located in a storage enclosure, detecting, based at least in part on the monitoring, an anomaly in relation to an operation of the storage drive, and communicating information regarding the anomaly to a remote computing device.

17 Claims, 6 Drawing Sheets

STORAGE DRIVE MONITORING

SUMMARY

The disclosure herein includes methods and systems for real-time storage drive monitoring. In some embodiments, the present systems and methods may monitor storage drives and provide real-time notifications regarding errors and operation-related issues.

A storage device for real-time storage drive monitoring is described. In one embodiment, the storage device may include a storage controller to monitor one or more aspects of a storage drive located in an enclosure of the system and to detect, based at least in part on monitoring the one or more aspects, an anomaly in relation to an operation of the storage drive, and a network adapter to communicate information regarding the anomaly to a remote computing device.

In some embodiments, the one or more monitored aspects include at least one of usage rate, operating temperature, cumulative operating time, identity of a process accessing the storage drive, rate of access of a process accessing the storage drive, occurrence of an error, and generation of an error code. In some cases, the network adapter may use an internet protocol (IP) communication protocol to communicate the information to the remote computing device. In some embodiments, the storage controller may be configured to detect on a regular basis a current status of the storage drive in relation to the one or more monitored aspects of the storage drive.

In some embodiments, the network adapter may be configured to communicate on a regular basis a status report to the remote computing device in relation to the current status of the storage drive. In some cases, the status report includes a device identifier of the storage drive. In some embodiments, the network adapter may be configured receive a request from the remote computing device for a current status relative to the one or more monitored aspects of the storage drive. In some embodiments, the storage controller may be configured to process the request and the network adapter may be configured to communicate the requested current status to the remote computing device.

In some embodiments, the storage drive may be a first storage drive from a plurality of storage drives located in a data storage enclosure. In some cases, the remote computing device receives status information from the first storage drive and a second storage drive from the plurality of storage drives, and the remote computing device compares the status information from the first storage drive to the status information from the second storage drive. In some embodiments, the remote computing device may detect a load imbalance based on comparing the status information from the first and second storage drives, and the remote computing device performs a load balancing between the first and second drives based at least in part on the detected load imbalance.

A method for real-time storage drive monitoring is also described. In one embodiment, the method may include monitoring one or more aspects of a storage drive located in a storage enclosure, detecting, based at least in part on the monitoring, an anomaly in relation to an operation of the storage drive, and communicating information regarding the anomaly to a remote computing device.

An apparatus for real-time storage drive monitoring is also described. In one embodiment, the apparatus may include a storage drive configured for incorporation into a data center or private cloud environment, a controller to monitor a health metric of the storage drive and to determine, based at least in part on the health metric, a failure prediction in relation to operating the storage drive, and an interface module to communicate information regarding the failure prediction to a host network device. In some cases, information regarding the failure prediction may be communicated to a host operating system. Additionally, or alternatively, information regarding the failure prediction may be communicated via an interface communication protocol that bypasses a host operating system. In some cases, the information regarding the failure prediction to be communicated may be modified or opted-out-of by an end user. In some cases, the host network device comprises a public internet protocol (IP) server. In some embodiments, the public IP server is managed by a manufacturer of the storage drive.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
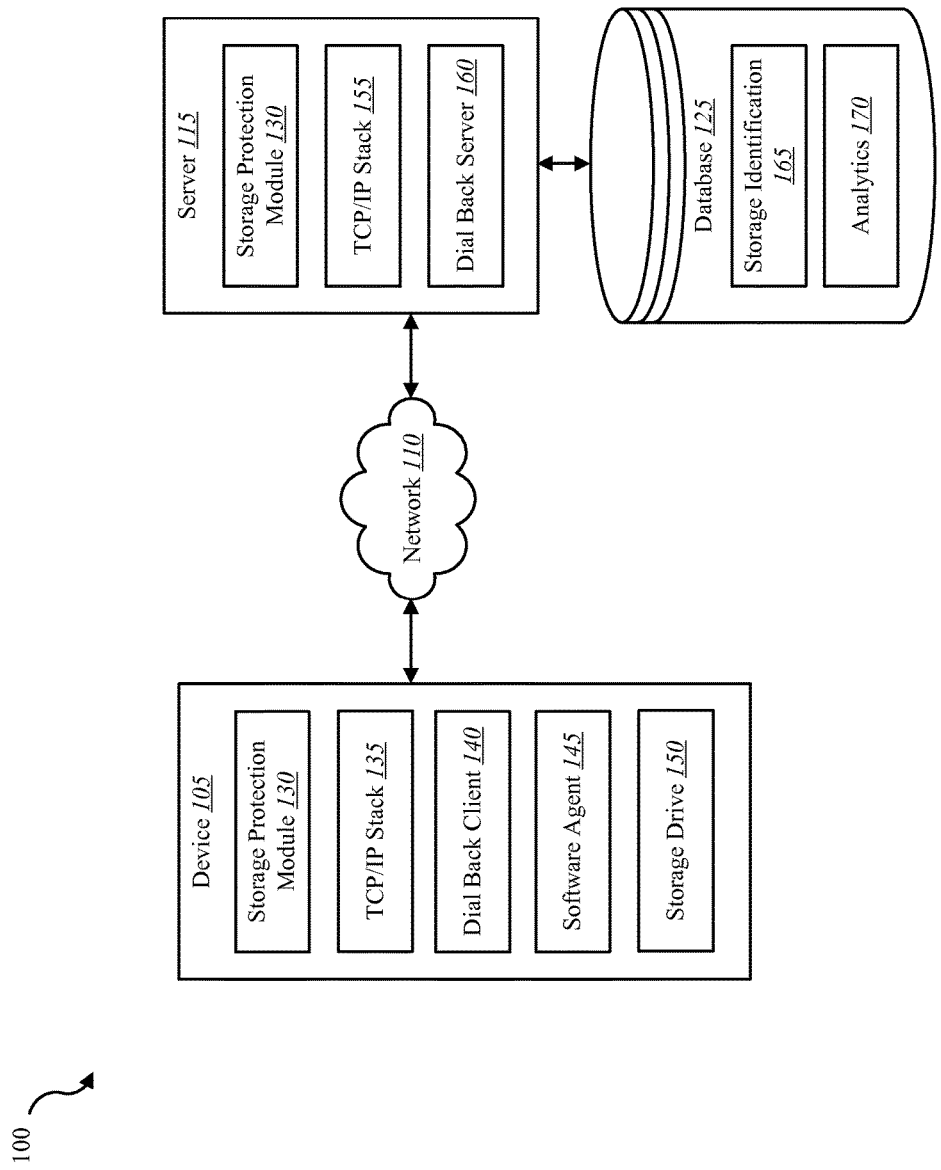
FIG. 1 is a block diagram of an example of a system in accordance with various embodiments.

The following relates generally to real-time storage drive monitoring. With current storage drives, a user learns of a problem with the storage drive only after the problem occurs. In one example, a storage enclosure may hold multiple storage drives. In some cases, the data on the multiple storage drives may be interconnected as a storage system such as the multiple drives being part of a redundant array of independent disks (RAID) system, part of a distributed data system, part of a cloud storage system, etc. When one or more of these multiple storage drives fails, the storage enclosure may indicate a failure has occurred. The user then must investigate and determine which drive failed. Once the user determines which drive failed, the user may remove the drive and order a replacement. The user may then have to wait until a replacement arrives to restore the system. If a replacement is already on hand, the user may replace the drive at that time and then initiate one or more steps to add the new drive to the system. Adding the new drive may include rebuilding at least a portion of the storage system of multiple drives, resulting in a disruption of at least a portion of services. Thus, disruption in service, loss of data, and/or a drop in performance may result both when the drive failure occurs as well as when the new drive is installed and/or the storage system of the multiple drives is rebuilt. In some cases, the user only learns of the problem after the effects from the problem begin to appear (e.g., service disruption, loss of data, drop in performance, spike in customer complaints, etc.), resulting in even longer disruptions to service, drops in performance, etc.

To remedy the problems described above, systems and methods of monitoring and communication may be implemented in a storage drive, as described herein, to enable the storage drive to detect errors and communicate a notification regarding the detected errors in real-time, and/or monitor a current status of the storage drive and communicate a status report to a predetermined destination, etc., such as a computing device (e.g., a local server, a remote server, etc.), an email address, a text message contact, a display on the affected storage enclosure, etc. The systems and methods may include tracking performance data of the storage drive such as cumulative operating time (e.g., time in an active state such as when the spindle is spinning, drive electronics are operating, etc.), usage rate, operating temperature, etc. In some cases, the storage drive may monitor one or more aspects of the drive (e.g., performance, usage rate current status, errors, etc.) and send a status report to one or more predetermined destinations on a regular basis.

In some cases, the storage drive may include an integrated network adapter or network interface controller such as an internet protocol (IP) based network adapter and/or a transmission control protocol (TCP) based network adapter. In some embodiments, the integrated network adapter may include at least a portion of a TCP/IP stack. In some configurations, the network adapter includes an Ethernet chipset. In some cases, the network adapter may include an IP router and/or an IP switch.

In one embodiment, the network adapter is in the same enclosure or case as the storage media of the storage drive. Thus, if the storage is a hard disk drive, then the network adapter may be within the same enclosure containing the platters of the hard disk, or if the storage disk is a solid state drive, then the network adapter may be located within the same enclosure as the flash memory of the solid state drive. In some embodiments, the network adapter may be integrated with the drive's electronic components. For example, a storage drive such as a hard disk drive or a solid state drive may include one or more printed circuit boards (PCBs) with electronics to control the operations of the storage drive. Thus, in one embodiment, the one or more printed circuit boards of a storage drive may include one or more microchips and/or integrated circuits of the integrated network adapter.

In some cases, the storage drive may include a software agent programmed to monitor the status and performance of the drive, detect failures, detect errors, detect usage rates, identify processes accessing the drive, and provide status reports to one or more external computing devices. For example, the software agent may connect to a remote server over the Internet via the integrated network adapter and provide information regarding the drive's current state and performance as requested and/or according to a predetermined status update schedule.

Unlike a network attached storage (NAS) device, the integrated network adapter of the storage drive of the present systems and methods may enable a computing device to connect to the storage drive not for remote access to the drive's storage media, but instead to remotely monitor the drive's performance in real time, to remotely access information regarding the drive's usage rates, to remotely identify a current status of the drive, to remotely identify errors, to remotely identify a potential for future errors and/or failures, to remotely detect anomalies, to remotely update the drive's firmware, and so forth. Moreover, a NAS is a computing device that includes one or more storage drives, but none of the storage drives of a NAS includes an integrated network adapter. If a storage drive of a NAS fails, the failure is not detected until an administrator notices the effects of the failure such as loss of data, loss or disruption to service, diminished quality of service, etc. Conversely, if in one embodiment a NAS were equipped with a storage drive with integrated network adapter and monitoring agent as described in the present systems and methods, the administrator of the NAS may receive an alert in real time regarding any abnormalities, anomalies, errors, failures, etc. Moreover, the alert notification may include a drive identifier (e.g., globally unique identifier (GUID), media access controller (MAC) address, etc.), enabling the administrator to locate the affected drive immediately and take appropriate actions including precautionary measures to avoid a disruption to service such as replacing or swapping out the affected drive for a known-good drive, executing a diagnosing software application to diagnose the affected drive, offloading the affected drive and shifting its load to one or more other drives, etc.

In one embodiment, a server (i.e., remote or local server) may access the storage drive via the storage drive's network adapter. Once connected, the server may access a current status of the storage drive. The server may collect and/or store the performance data of several storage drives, such as the multiple storage drives in a storage enclosure. In some cases, the server may store the data based on device identifiers of each monitored storage drive. The server may process the collected data and compare the performance of one drive to another. The server may detect patterns among the storage drives and generate notifications and/or alerts regarding the detected patterns. In some cases, the server may modify one or more processes associated with the drives based on the detected patterns. For example, the server may detect that a first storage drive operates at a higher rate than the second storage drive. Accordingly, the server may modify the operations performed on each drive so that both drives perform operations at a similar, balanced rate. In some cases, the server may generate a notification indicating the imbalance. In some embodiments, a user of the server may receive the notification, enabling the user to notify an administrator of the storage enclosure that a review of the storage drives indicates a particular drive in the storage enclosure may have one or more issues as indicated. Accordingly, an issue with a storage drive may be handled in real-time and in some cases, further problems may be bypassed by acting before a failure occurs. For example, a storage drive in a storage enclosure may indicate an operation of the drive falls outside of a normal range of performance. If left alone, or left undetected in the case of a conventional drive, the abnormal operation may eventually result in the drive failing. However, based on the present systems and methods, upon identifying the abnormal operation, steps may be taken to avoid disruption to the storage enclosure's service. For example, a diagnostic may be performed on the drive to gather more information regarding the abnormality. In some cases, an operation may be performed to offload the drive and take it offline without affecting the performance of the other drives and/or storage enclosure. Accordingly, the storage enclosure may continue to operate while the affected drive is inspected and/or replaced, thus avoiding potentially catastrophic failure.

In some embodiments, the storage drive may generate one or more error codes based on a detected error or failure condition. For example, errors may include write errors, read errors, recoverable read errors, unrecoverable read errors, etc. Failures within the drive may include electrical failure, mechanical failure, logical failure, firmware failure, etc. For example, a drive may experience circuit failure (e.g., component of the electronic circuitry of the drive fails), a head crash, bad sectors, stiction (e.g., stuck head), bearing failure, motor failure, etc. Failures may be caused by extended use, excessive heat, physical force, power surges, water damage, corrupted files, human error, etc. In some cases, the drive may provide a color-coded status report based on a current status of the drive. For example, the drive may provide a green status when no errors or failures are detected. The drive may provide a yellow status when errors or failures are detected, but the drive is still operating and/or the drive continues to meet a certain performance threshold. The drive may provide a red status when errors or failures are detected and the drive is no longer operating or the drive fails to satisfy a given performance threshold. Accordingly, the systems and methods described herein provide a system that detects issues (e.g., anomalies, errors, failures, etc.) with a storage drive in real time and provides notifications regarding the issues in real time, enabling a user to react to the issues in a timely fashion and to anticipate and/or remedy serious problems before they are allowed to occur.

FIG. 1 is a block diagram illustrating one embodiment of an environment 100 in which the present systems and methods may be implemented. In some embodiments, the systems and methods described herein may be performed on a client device (e.g., device 105). The environment 100 may include device 105, network 110, server 115, and database 125.

Device 105 may include storage protection module 130, TCP/IP stack 135, dial back client 140, software agent 145, and storage drive 150 (e.g., storage media). Examples of the device 105 include a storage drive (e.g., hard disk drive, solid state drive, hybrid drive, etc.), a storage server, a storage enclosure, a computing device, etc. Data protection module 130 may be configured to monitor storage drives and provide real-time notifications regarding errors and operation-related issues. Further details regarding the data protection module 130 are discussed below.

In some embodiments, TCP/IP stack 135 may operate using a computer networking model and may include a set of communications protocols used on the Internet and similar computer networks. In some cases, the device 105 may include an Ethernet chipset that operate in conjunction with the TCP/IP stack 135. In some embodiments, the dial back client 140 may operate in conjunction with the TCP/IP stack 135 to establish a network connection with a server such as server 115. The software agent 145 may include one or more software applications, software code, firmware, and such to monitor one or more aspects of device 105 and generate notifications regarding the real-time status of device 105. Examples of software agent 145 may include any combination of a program installed on device 105, a web browser, a web-based application (e.g., any combination of JavaScript, hypertext markup language (HTML), etc.). In some embodiments, software agent 145 may enable a user of device 105 to interface with a function of server 115, database 125, and/or data protection module 130. For example, software agent 145 may enable device 105 to interface with the data protection module 130 on another device such as on server 115. In some cases, server 115 may include an agent similar to software agent 145. For example, an application on server 115 may enable server 115 to interface with device 105.

In some embodiments, device 105 may communicate with server 115 via network 110. Examples of network 110 may include cloud networks, local area networks (LAN), wide area networks (WAN), virtual private networks (VPN), wireless networks (using 802.11, for example), cellular networks (using 3G and/or LTE, for example), etc. In some configurations, the network 110 may include the Internet.

Server 115 may include storage protection module 130, TCP/IP stack 155, and dial back server 160. Examples of server 115 may include a storage server, cloud server, a data server, a corporate server, a home automation server, etc. In some embodiments, device 105 and/or server 115 may each include a data protection module where at least a portion of the functions of data protection module 130 are performed separately and/or concurrently on device 105 and/or server 115. The TCP/IP stack 155 on server 115 may be similar to TCP/IP stack 135 in one or more aspects as described above. In some embodiments, dial back server 160 may enable device 105 to establish a connection with server 115. For example, dial back server 160 may handle requests from dial back client 140 to establish such a connection.

As illustrated, server 115 may be coupled to database 125. In some cases, database 125 may include storage identification 165 and analytics 170. Storage identification 165 may include a list of one or more storage devices such as device 105. For example, device 105 may include a unique identifier (e.g., a globally unique identifier (GUID)). Storage identification 165 may include the unique identifier of device 105 in a list of device identifiers. Accordingly, device 105 may include a device identifier in a notification sent to the server 115. When server 115 receives the notification from device 105, server 115 identifies device 105 as the affected device. For example, server 115 may query the list of identifiers in storage identification 165 to identify a match. The query may indicate device 105 is a match for the provided device identifier. In some embodiments, server 115 may analyze data received from device 105 and one or more additional devices. In some cases, server 115 may save results of its analysis in analytics 170. For example, data from device 105 may be compared with data from another device. The results of the comparison may indicate that device 105 carries a higher operational load than the other device. These results may be stored in analytics 170.

Figure 2:
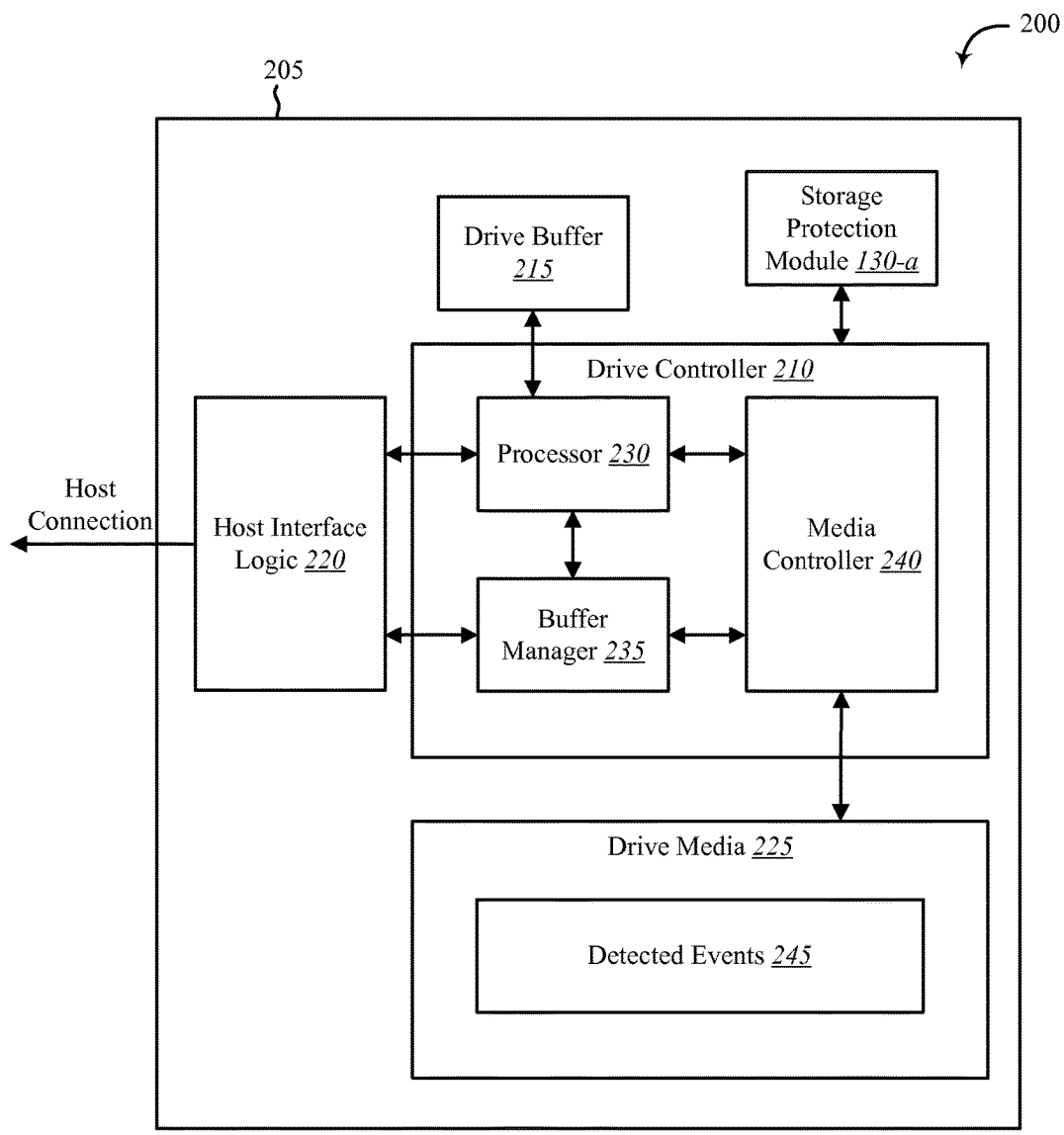
FIG. 2 shows a block diagram of an apparatus in accordance with various aspects of this disclosure.

FIG. 2 shows a block diagram 200 of an apparatus 205 for use in electronic communication, in accordance with various aspects of this disclosure. The apparatus 205 may be an example of one or more aspects of device 105 described with reference to FIG. 1. The apparatus 205 may include a drive controller 210, drive buffer 215, host interface logic 220, drive media 225, and storage protection module 130-a. Each of these components may be in communication with each other and/or other components directly and/or indirectly.

One or more of the components of the apparatus 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

In one embodiment, the drive controller 210 may include a processor 230, a buffer manager 235, and a media controller 240. The drive controller 210 may process, via processor 230, read and write requests in conjunction with the host interface logic 220, the interface between the apparatus 205 and the host of apparatus 205 (e.g., an operating system, host hardware system, etc.). The driver buffer 215 may hold data temporarily for internal operations of apparatus 205. For example, a host may send data to apparatus 205 with a request to store the data on the drive media 225. The driver controller 210 may process the request and store the received data in the drive media 225. In some cases, a portion of data stored in the drive media 225 may be copied to the drive buffer 215 and the processor 230 may process or modify this copy of data and/or perform an operation in relation to this copy of data held temporarily in the drive buffer 215.

In some embodiments, the drive media 225 may store information associated with one or more detected events 245. The detected events 245 may include events associated with the operations of apparatus 205 such as cumulative operation time since initializing apparatus 205, the number of reads, writes, and/or erases per predetermined measure of time, the number of reads, writes, and/or erases performed since initializing apparatus 205, etc. In some embodiments, the detected events 245 may include one or more detected errors associated with the operation of apparatus 205. In some embodiments, host interface logic 220 may connect to a host of apparatus 205. Examples of hosts may include a storage enclosure, a storage server, a computing device, etc. In some cases, the host interface logic 220 may use one or more IP communication protocols to communicate with a host and/or one or more remote computing devices.

Although depicted outside of drive controller 210, in some embodiments, storage protection module 130-a may include software, firmware, and/or hardware located within and/or outside of drive controller 210. For example, storage protection module 130-a may include at least a portion of processor 230, buffer manager 235, media controller 240, driver buffer 215, host interface 220, drive media 225, and/or one or more other elements of apparatus 205. In one example, storage protection module 130-a may include one or more instructions executed by processor 230, buffer manager 235, and/or media controller 240. The storage protection module 130-a may be configured to monitor one or more aspects of apparatus 205, including operational status, errors, detected performance, etc., and communicate a status of apparatus 205 in real-time.

Figure 3:
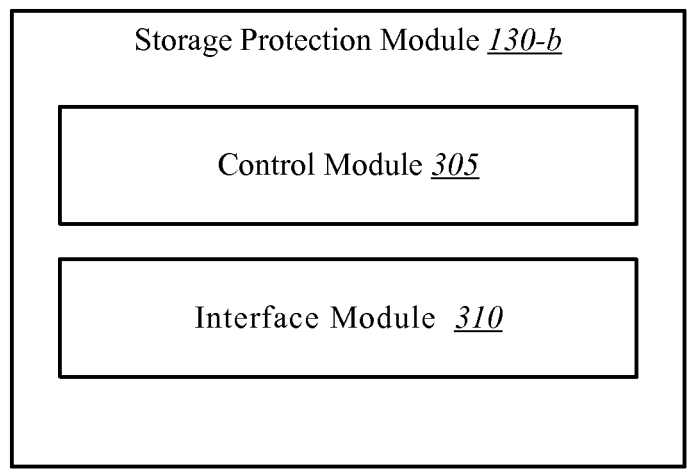
FIG. 3 shows a block diagram of a device in accordance with various aspects of this disclosure.

FIG. 3 shows a block diagram 300 of a storage protection module 130-b. The storage protection module 130-b may include one or more processors, memory, and/or one or more storage devices. The storage protection module 130-b may include control module 305 and interface module 310. The storage protection module 130-b may be one example of storage protection module 130 of FIGS. 1 and/or 2. Each of these components may be in communication with each other.

In one embodiment, control module 305 may determine a failure prediction in relation to operating a storage drive. In some cases, the control module 305 may determine a failure predication based at least in part on the health metric. In one embodiment, the control module 305 may monitor one or more aspects of a storage drive located in an enclosure of a storage system. Additionally, or alternatively, control module 305 may monitor one or more aspects of a storage drive configured for incorporation into a data center or private cloud environment. In some embodiments, the storage drive is a storage drive among several storage drives located in a data storage enclosure.

In some embodiments, the one or more monitored aspects may include at least one of usage rate, operating temperature, cumulative operating time, identity of a process accessing the storage drive, rate of access of a process accessing the storage drive, occurrence of an error, and generation of an error code. The usage rate may include a ratio of the storage drive in an active mode (e.g., occurrence of reads/writes, spindle spinning, drive electronics powered up, etc.) to the storage drive in an idle mode (e.g., sleep, standby mode, etc.) over a given time period. In some cases, the usage rate may include the number or reads and/or writes over a given time period, an amount of data read and/or written over a given time period, etc. In some cases, the server may receive the usage rate information from a first drive and the usage rate information from a second drive. The usage rate from each drive may indicate that the first drive is being used proportionately more than the second drive. Accordingly, the server may generate an notification indicating the first drive may be overused in relation to the second drive. In some cases, the server may perform a load balancing operation to balance the load between the first and second drive.

In some cases, the control module 305 may identify a mean time before failure (MTBF) for the storage drive. The control module 305 may determine a model of a new drive installed in a storage system and determine its MTBF based on the model information. In some cases, the control module 305 may assign a default MTBF to each new drive. In some embodiments, an administrator may assign a MTBF to a new drive, thus the control module 305 may receive the MTBF from the administrator. The control module 305 may determine a remaining amount of time before a likely failure of the storage drive based on the information from the storage drive. For example, the control module 305 may track a cumulative operating time of the storage drive, tracking information such as the amount of time the storage drive is in an active state (e.g., spindles operating, read/write operations, etc). For example, a storage drive may be assigned an MTBF of 100,000 hours. The control module 305 may receive information from the storage drive and subtract each active hour of operation from the 100,000 MTBF hours. In some cases, the control module 305 may display text, graphs, etc., that indicate the number of hours the storage drive has used so far of the total MTBF hours, the number of hours remaining, etc. In some cases, the control module 305 may compare the number of active-mode hours to a predetermined MTBF threshold. The control module 305 may generate a notification once the tracked number of hours the storage drive has been in an active mode satisfies the threshold. As one example, once the storage drive has used 80% of the MTBF hours, the control module 305 may generate a notification.

In some embodiments, control module 305 may detect an anomaly in relation to an operation of the storage drive. The control module 305 may detect the anomaly based at least in part on monitoring the one or more aspects. In some embodiments, control module 305 may monitor the storage controller to detect on a regular basis a current status of the storage drive in relation to the one or more monitored aspects of the storage drive. In some embodiments, control module 305 may monitor a health metric of the storage drive.

In one embodiment, the interface module 310 may communicate information regarding a detected anomaly and/or one or more health metrics to one or more predetermined destinations such as a remote computing device, a local computing device, an email, a text message contact, etc. In some cases, interface module 310 may use an internet protocol (IP) communication protocol to communicate the information to the one or more predetermined destinations. In one embodiment, the affected storage drive may include a device identifier. In some embodiments, the interface module 310 may include the device identifier in the information communicated to the one or more predetermined destinations.

In some embodiments, interface module 310 may communicate information regarding the failure prediction to a host network device. In some cases, interface module 310 may communicate information regarding a failure prediction to a host operating system. In one configuration, interface module 310 may communicate information regarding the failure prediction via an interface communication protocol that bypasses a host operating system. In some cases, the information regarding the failure prediction may be modified or opted-out-of by an end user. In some embodiments, a host network device may include a public internet protocol (IP) server. Thus, interface module 310 may send information regarding failure predictions and or detected anomalies to the public IP server. In some cases, the public IP server may be managed by a manufacturer of the storage drive. Accordingly, the manufacturer of the storage drive may receive notifications regarding detected issues with one or more storage drives. Based on this information, the manufacturer may determine one or more potential solutions, including providing replacement storage drives.

In some embodiments, interface module 310 may communicate on a regular basis a status report to the one or more predetermined destinations in relation to the current status of the storage drive. For example, the control module 305 may determine the current status of the storage drive and the interface module 310 may communicate this status to the one or more predetermined destinations. In some cases, the interface module 310 may include a color-coded status symbol to visually indicate the status of the storage drive. For example, the interface module 310 may provide a green status when no errors or failures are detected. The interface module 310 may provide a yellow status when errors or failures are detected, but the drive is still operating and/or the drive continues to meet a certain performance threshold. The interface module 310 may provide a red status when errors or failures are detected and the drive is no longer operating or the drive fails to satisfy a given performance threshold. Thus, the recipient of the status may determine the status of the storage drive instantly by looking at the provided visual status. In some cases, the interface module 310 may send the status of multiple storage drives (e.g., the storage drives within a storage enclosure). The color-coded status of each drive may be provided in a status update. In some cases, the color-coded status symbols may be provided in an ordered list. For example, the interface module 310 may include all drives with red-status first in the list, followed by yellow-status drives, and finally green-status drives.

In some embodiments, the interface module 310 may include the device identifier in the information communicated to the one or more predetermined destinations and/or within a communicated status update. In some cases, interface module 310 may include a device identifier with a status report. In some embodiments, the device identifier may include information regarding a storage drive's location in a storage enclosure (e.g., a row and column number, etc.)

In some embodiments, interface module 310 may receive a request from a remote computing device for a current status relative to the one or more monitored aspects of the storage drive. In some cases, control module 305 may process the request for current storage drive status. In some embodiments, the control module 305 may process the request in real time. Accordingly, interface module 310 may communicate the requested current status to the remote computing device.

In some embodiments, a computing device (e.g., a local computing device, a remote computing device, a storage server, a storage enclosure, etc.) receives status information from a first storage drive and a second storage drive from multiple drives associated with a storage enclosure or storage server. The computing device may compare the status information from the first storage drive to the status information from the second storage drive. In some embodiments, the computing device detects a load imbalance based on comparing the status information from the first and second storage drives. Accordingly, the computing device may perform a load balancing between the first and second drives based at least in part on the detected load imbalance.

Figure 4:
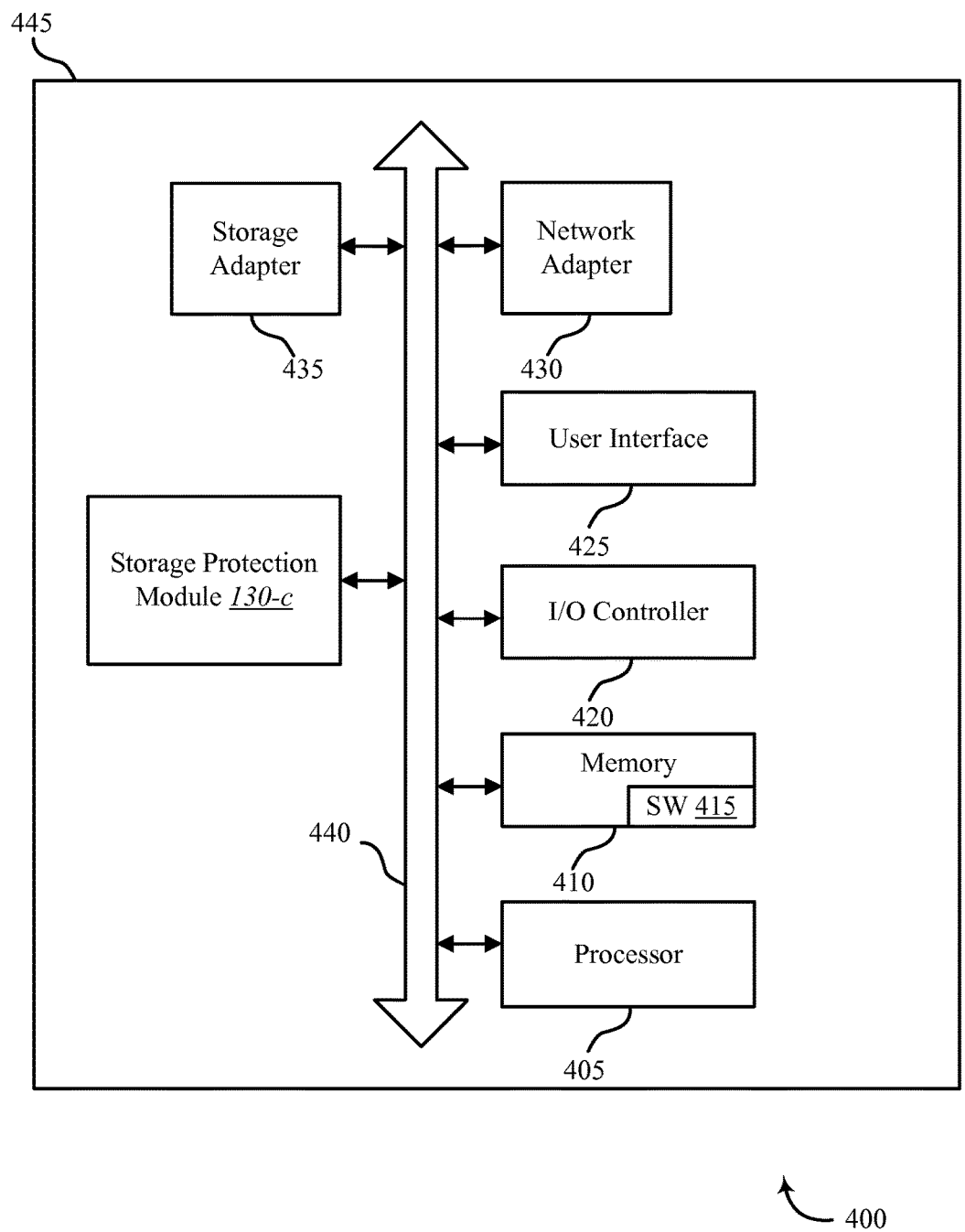
FIG. 4 shows a diagram of a system in accordance with various aspects of this disclosure.

FIG. 4 shows a system 400 for real-time storage drive monitoring, in accordance with various examples. System 400 may include an apparatus 445, which may be an example of any one of device 105 of FIG. 1 and/or device 205 of FIG. 2.

Apparatus 445 may include components for bi-directional voice and data communications including components for transmitting communications and components for receiving communications. For example, apparatus 445 may communicate bi-directionally with one or more storage devices and/or client systems. This bi-directional communication may be direct (e.g., apparatus 445 communicating directly with a storage system) and/or indirect (e.g., apparatus 445 communicating indirectly with a client device through a server).

Apparatus 445 may also include a processor module 405, and memory 410 (including software/firmware code (SW) 415), an input/output controller module 420, a user interface module 425, a network adapter 430, and a storage adapter 435. The software/firmware code 415 may be one example of a software application executing on apparatus 445 (e.g., software agent 145). The network adapter 430 may communicate bi-directionally—via one or more wired links and/or wireless links—with one or more networks and/or client devices. In some embodiments, network adapter 430 may provide a direct connection to a client device via a direct network link to the Internet via a POP (point of presence). In some embodiments, network adapter 430 of apparatus 445 may provide a connection using wireless techniques, including digital cellular telephone connection, Cellular Digital Packet Data (CDPD) connection, digital satellite data connection, and/or another connection. The apparatus 445 may include a storage protection module 130-*b*, which may perform the functions described above for storage protection module 130 of FIGS. 1, 2, and/or 3.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 430 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

One or more buses 440 may allow data communication between one or more elements of apparatus 445 (e.g., processor module 405, memory 410, I/O controller module 420, user interface module 425, network adapter 430, and storage adapter 435, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure. Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405, but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the memory 410 may contain, among other things, the Basic Input-Output system (BIOS) which may control basic hardware and/or software operation such as the interaction with peripheral components or devices. For example, at least a portion of the storage protection module 130-*b* to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., network adapter 430, etc.).

Many other devices and/or subsystems may be connected to one or may be included as one or more elements of system 400 (e.g., personal computing device, mobile computing device, smart phone, server, internet-connected device, cell radio module, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be a mobile device operation system, a desktop/laptop operating system, or another known operating system.

The I/O controller module 420 may operate in conjunction with network adapter 430 and/or storage adapter 435. The network adapter 430 may enable apparatus 445 with the ability to communicate with client devices (e.g., device 105 of FIG. 1), and/or other devices over the network 110 of FIG. 1. Network adapter 430 may provide wired and/or wireless network connections. In some cases, network adapter 430 may include an Ethernet adapter or Fibre Channel adapter. Storage adapter 435 may enable apparatus 445 to access one or more data storage devices (e.g., storage device 110). The one or more data storage devices may include two or more data tiers each. The storage adapter may include one or more of an Ethernet adapter, a Fibre Channel adapter, Fibre Channel Protocol (FCP) adapter, a SCSI adapter, and iSCSI protocol adapter.

Figure 5:
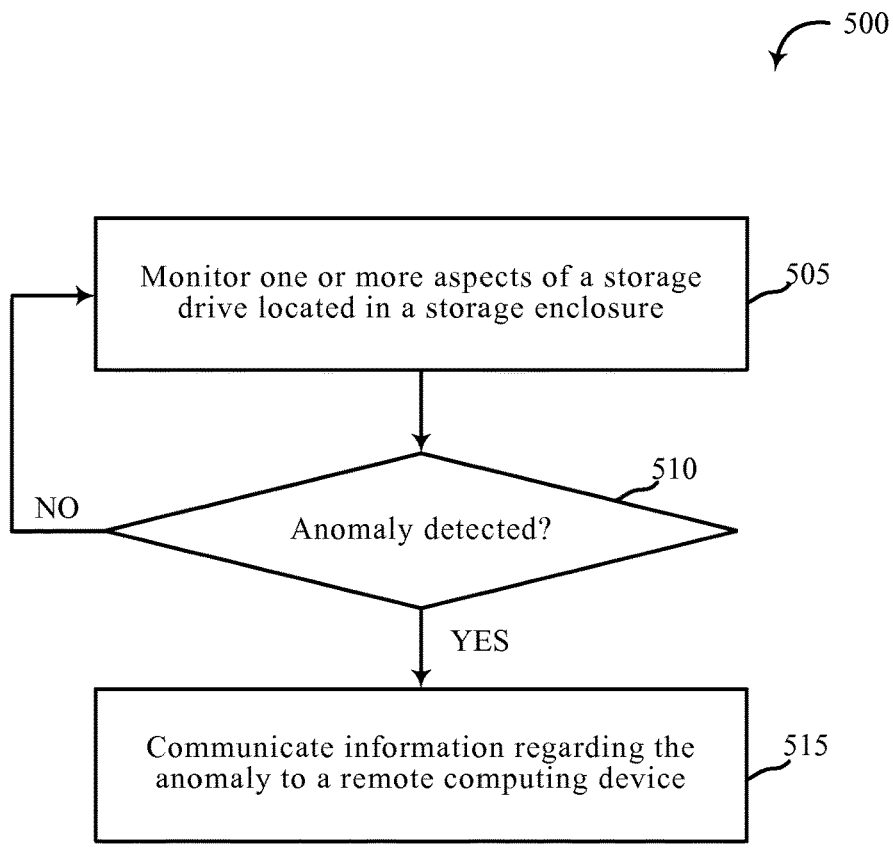
FIG. 5 is a flow chart illustrating an example of a method in accordance with various aspects of this disclosure.

FIG. 5 is a flow chart illustrating an example of a method 500 for real-time storage drive monitoring, in accordance with various aspects of the present disclosure. One or more aspects of the method 500 may be implemented in conjunction with device 105 of FIG. 1, apparatus 205 of FIG. 2, apparatus 445 of FIG. 4, and/or storage protection module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 505, the method 500 may include monitoring one or more aspects of a storage drive located in a storage enclosure. In some cases, the one or more monitored aspects may include at least one of usage rate, operating temperature, cumulative operating time, identity of a process accessing the storage drive, rate of access of a process accessing the storage drive, occurrence of an error, generation of an error code, etc. At block 510, the method 500 may include determining whether an anomaly in relation to an operation of the storage drive is detected. If an anomaly is not detected, the method 500 continues to monitor for anomalies. If an anomaly is detected, at block 515, the method 500 may include communicating information regarding the anomaly to a remote computing device.

The operation(s) at block 505-515 may be performed using the storage protection module 130 described with reference to FIGS. 1-4 and/or another module. Thus, the method 500 may provide for real-time storage drive monitoring relating to real-time storage drive monitoring. It should be noted that the method 500 is just one implementation and that the operations of the method 500 may be rearranged, omitted, and/or otherwise modified such that other implementations are possible and contemplated.

Figure 6:
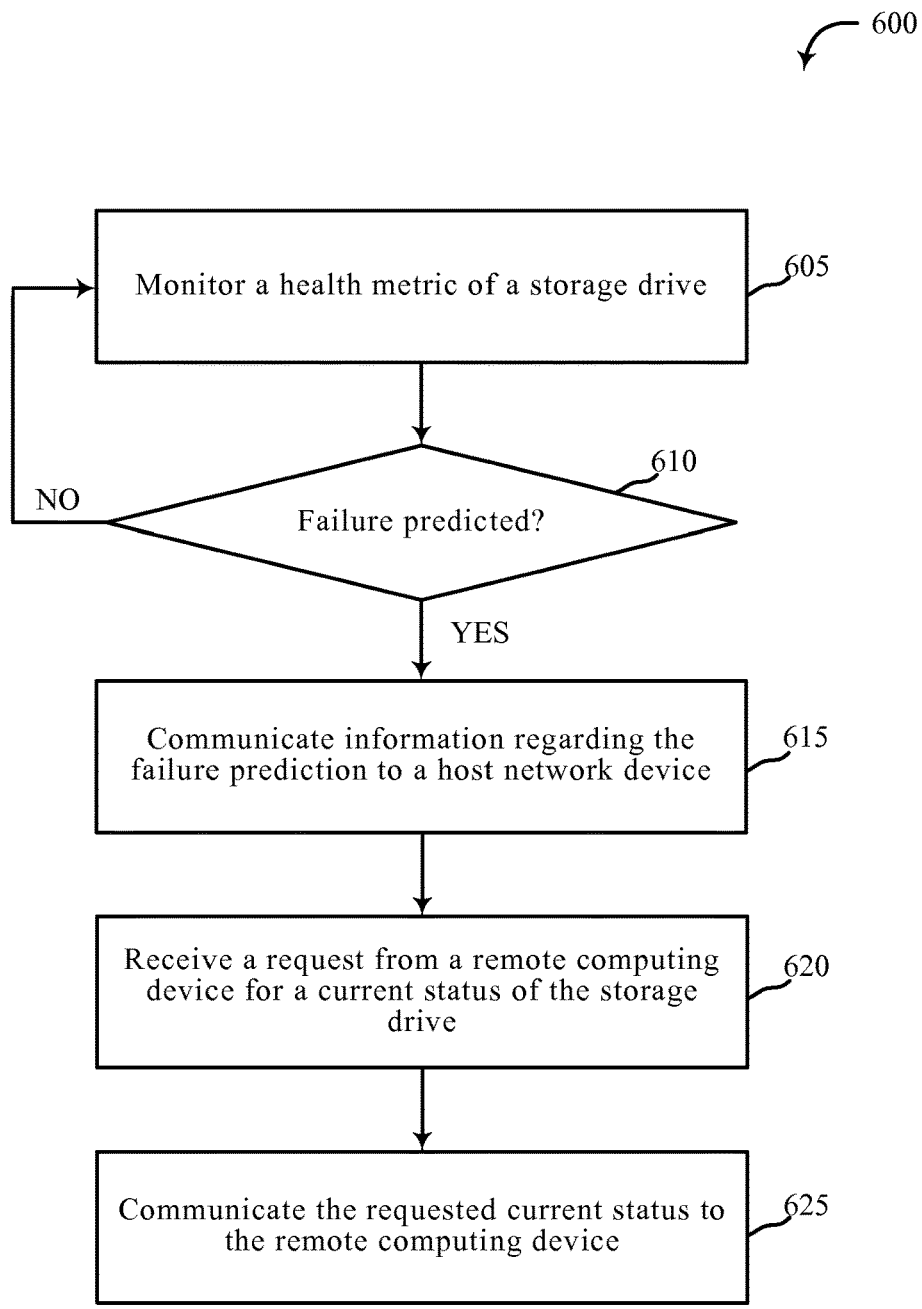
FIG. 6 is a flow chart illustrating an example of a method in accordance with various aspects of this disclosure.

FIG. 6 is a flow chart illustrating an example of a method 600 for real-time storage drive monitoring, in accordance with various aspects of the present disclosure. One or more aspects of the method 600 may be implemented in conjunction with device 105 of FIG. 1, apparatus 205 of FIG. 2, apparatus 445 of FIG. 4, and/or storage protection module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 605, the method 600 may include monitoring a health metric of a storage drive. In some cases, the storage drive may be configured for incorporation into a data center or private cloud environment. At block 610, the method 600 may include determining, based at least in part on the health metric, whether a failure is predicted. If a failure is not predicted, then the method 600 may continue to monitor one or more health metrics. On the other hand, if a failure is predicted, at block 615, the method 600 may include communicating information regarding the failure prediction to a host network device. At block 620, the method 600 may include receiving a request from a remote computing device for a current status of the storage drive. At block 625, the method 600 may include communicating the requested current status to the remote computing device.

The operations at blocks 605-625 may be performed using the storage protection module 130 described with reference to FIGS. 1-4 and/or another module. Thus, the method 600 may provide for real-time storage drive monitoring relating to real-time storage drive monitoring. It should be noted that the method 600 is just one implementation and that the operations of the method 600 may be rearranged, omitted, and/or otherwise modified such that other implementations are possible and contemplated.

In some examples, aspects from two or more of the methods 500 and 600 may be combined and/or separated. It should be noted that the methods 500 and 600 are just example implementations, and that the operations of the methods 500 and 600 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A storage system comprising:
 a storage controller of a first storage drive to process read requests and write requests over a data connection between the first storage drive and a host system of the first storage drive, to monitor one or more aspects of the first storage drive and to detect, based at least in part on monitoring the one or more aspects, an anomaly in relation to an operation of the first storage drive; and
 a network adapter of the first storage drive to establish a direct connection between the first storage drive and a remote computing device, the direct connection being separate from the data connection, and to communicate over the direction connection information regarding the anomaly to a remote computing device to improve communication abilities of storage drives, the remote computing device receiving status information from the first storage drive and a second storage drive associated with the host system, the remote computing device comparing the status information from the first storage drive to the status information from the second storage drive, the remote computing device detecting a load imbalance based on comparing the status information from the first and second storage drives, the remote computing device performing a load balancing between the first and second drives based at least in part on the load imbalance, the storage controller and the network adapter located in a same case as a storage medium of the first storage drive.

2. The storage system of claim 1, wherein the one or more monitored aspects include at least one of usage rate, operating temperature, cumulative operating time, identity of a process accessing at least one of the first and second storage drives, rate of access of a process accessing at least one of the first and second storage drives, occurrence of an error, and generation of an error code.

3. The storage system of claim 1, wherein the network adapter uses an internet protocol (IP) communication protocol to communicate the information to the remote computing device.

4. The storage system of claim 1, comprising:
 the storage controller to detect on a regular basis a current status of the first storage drive in relation to the one or more monitored aspects of the first storage drive.

5. The storage system of claim 4, comprising:
 the network adapter to communicate on the regular basis a status report to the remote computing device in relation to the current status of the first storage drive, wherein the status report includes a device identifier of the first storage drive.

6. The storage system of claim 1, comprising:
 the network adapter to receive a request from the remote computing device for a current status relative to the one or more monitored aspects of the first storage drive.

7. The storage system of claim 6, comprising:
 the storage controller to process the request; and
 the network adapter to communicate the requested current status to the remote computing device.

8. An apparatus comprising:
 a first storage drive configured for incorporation into a data center or private cloud environment;
 a storage controller of the first storage drive to process read requests and write requests over a data connection between the first storage drive and a host system of the first storage drive, to monitor a health metric of the first storage drive and to determine, based at least in part on the health metric, a failure prediction in relation to operating the first storage drive; and
 a network adapter of the first storage drive to establish a direct connection between the first storage drive and a host network device separate from the data connection, and to communicate over the direction connection information regarding the failure prediction to a host network device to improve communication abilities of the first storage drive, the host network device receiving status information from the first storage drive and a second storage drive, the host network device comparing the status information from the first storage drive to the status information from the second storage drive, the host network device performing a load balancing between the first and second drives based at least in part on a detected load imbalance from the first and second storage drives, the storage controller, the network adapter, and one of both of flash memory or hard disk platters all enclosed in a first storage drive case.

9. The apparatus of claim 8, wherein information regarding the failure prediction is communicated to a host operating system.

10. The apparatus of claim 8, wherein information regarding the failure prediction is communicated via an interface communication protocol that bypasses a host operating system.

11. The apparatus of claim 8, wherein the information regarding the failure prediction to be communicated can be modified or opted-out-of by an end user.

12. The apparatus of claim 8, wherein the host network device comprises a public internet protocol (IP) server.

13. The apparatus of claim 12, wherein the public IP server is managed by a manufacturer of the first storage drive.

14. A method comprising:
monitoring, via drive electronics comprising a storage controller of a first storage drive, one or more aspects of the first storage drive associated with a host system;
processing, via drive electronics comprising the storage controller, read requests and write requests over a data connection between the first storage drive and the host system;
detecting, via drive electronics comprising the storage controller, based at least in part on the monitoring, an anomaly in relation to an operation of the first storage drive;
establishing, via a network adapter integrated with the drive electronics of the first storage drive, a direct connection between the first storage drive and a remote computing device, the direct connection being separate from the data connection; and
communicating, via the network adapter integrated with the drive electronics over the direction connection, information regarding the anomaly to a remote computing device, the remote computing device receiving status information from the first storage drive and a second storage drive associated with the host system, the remote computing device comparing the status information from the first storage drive to the status information from the second storage drive, the remote computing device performing a load balancing between the first and second drives based at least in part on comparing the status information from the first and second storage drives.

15. The method of claim 14, wherein the one or more monitored aspects include at least one of usage rate, operating temperature, cumulative operating time, identity of a process accessing the first storage drive, rate of access of a process accessing the first storage drive, occurrence of an error, and generation of an error code.

16. The method of claim 14, wherein the remote computing device comprises a public internet protocol (IP) server.

17. The apparatus of claim 16, wherein the public IP server is managed by a manufacturer of the first storage drive.

* * * * *